Oct. 26, 1965  J. EGGERT  3,213,750
SLIDE PROJECTOR WITH VARIABLE APERTURE DIAPHRAGM FOR OBJECTIVE
Filed Dec. 7, 1962  2 Sheets-Sheet 1

Oct. 26, 1965  J. EGGERT  3,213,750
SLIDE PROJECTOR WITH VARIABLE APERTURE DIAPHRAGM FOR OBJECTIVE
Filed Dec. 7, 1962  2 Sheets-Sheet 2

United States Patent Office 3,213,750
Patented Oct. 26, 1965

3,213,750
SLIDE PROJECTOR WITH VARIABLE APERTURE DIAPHRAGM FOR OBJECTIVE
Joachim Eggert, Braunschweig, Germany, assignor to Voigtlander, A.G., Braunschweig, Germany, a corporation of Germany
Filed Dec. 7, 1962, Ser. No. 243,086
Claims priority, application Germany, Dec. 11, 1961, V 21,719
10 Claims. (Cl. 88—24)

This invention relates to slide projectors of the type provided with adjustable diaphragms having variable apertures for controlling the projected light and, more particularly, to a novel and improved diaphragm arrangement for projectors of this type.

In the slide projector art, it is frequently desirable to compensate for differences in brightness between different slides to be projected by utilizing light controlling or attenuating means mounted in the light ray path through the projector. These light controlling or attenuating means usually comprise either filters or variable aperture diaphragms, such as iris diaphragms. The purpose of such light controlling arrangement is to assure uniform light intensity of the projected slides, even where the slides having varying degrees of luminous density or have been improperly exposed.

In conventional arrangements using iris diaphragms for this purpose, the iris diaphragm has been mounted at a point in the objective lens where the effect of the diaphragm is not only that of attenuating the brightness but also that of reducing the field of vision. The mounting position of the diaphragm corresponds to that generally used in photographic camera objectives wherein the iris diaphragm is located at the narrowest point of the ray path, or at the intersection of the converging-diverging light rays. Mounting the diaphragm at this position in a projector objective has the disadvantage, however, that it contributes appreciably to heating of the diaphragm, particularly when the diaphragm is partially or nearly completely closed. This is due to the fact that the heat emitting elements of the projector, such as the lamp filament, are sharply focused, by the condensing lens system and the rear optical member of the objective precisely at that point in the objective where the diaphragm is located.

In many conventional projectors of the mentioned type, the objective lens is mounted so as to project into the projector housing. Consequently, it is very difficult to provide, on the objective, a diaphragm setting device which is accessible from the exterior of the projector housing.

It is further desirable to design slide projectors for use with interchangeable objectives of different focal lengths, so as to compensate for various distances between the projector and the surface upon which a slide is projected. It is impractical to have a separate iris diaphragm associated with each different objective for coupling with a diaphragm setting device on the projector housing by means of additional driving members and coupling means. Specifically, such coordination of diaphragms individual to each different objective presents practical problems, particularly in projectors designed for automatic control of the diaphragm aperture, as a function of the density of the slide to be projected. In such case, it would be necessary to provide coupling means which would, upon the insertion of a given objective into the projector, establish a coupling with the individual diaphragm of such objective. Such coupling means have the disadvantage that play between the coupling parts, and the energy required for adjustment, necessitate additional control motors. Furthermore, such coupling means are not only complicated but also prone to faulty operation, as is well known to those skilled in the art.

In accordance with the present invention, a slide projector is provided which has a variable aperture diaphragm which, in a simple and advantageous manner, is positioned at a point displaced axially from the intersection point of the light rays at which sharp focusing of the lamp filament occurs, and which does not reduce the field of vision. The projector is usable with different and interchangeable objectives without necessitating an individual diaphragm for each objective, the single diaphragm in the projector being cooperable with any of the interchangeable objectives.

More particularly, in the invention slide projector the adjustable diaphragm is mounted in a separate mounting member which is separate from and independent of the objective mount, and the diaphragm mounting member is adjustable axially or lengthwise of the projector housing in such a manner that the diaphragm is constantly maintained at a fixed axial distance directly behind the last lens of the objective even during focusing adjustment of the objective. A diaphragm setting device is operatively connected to the diaphragm and may be coupled either with a setting member exterior to the projector housing or with an automatically controlled servo motor within the housing.

In one embodiment of the invention, both the diaphragm mounting member and the objective mount are positioned in a common mounting in a common support element which is axially adjustable for focusing. Through the mentioned servo motor, the diaphragm setting device can be coupled with means for automatically controlling the diaphragm aperture as a function of the luminous density of any particular slide to be projected.

For an understanding of the principles of the invention, reference is made to the following description of typical embodiments thereof as illustrated in the accompanying drawings. In the drawings.

Figure 1:
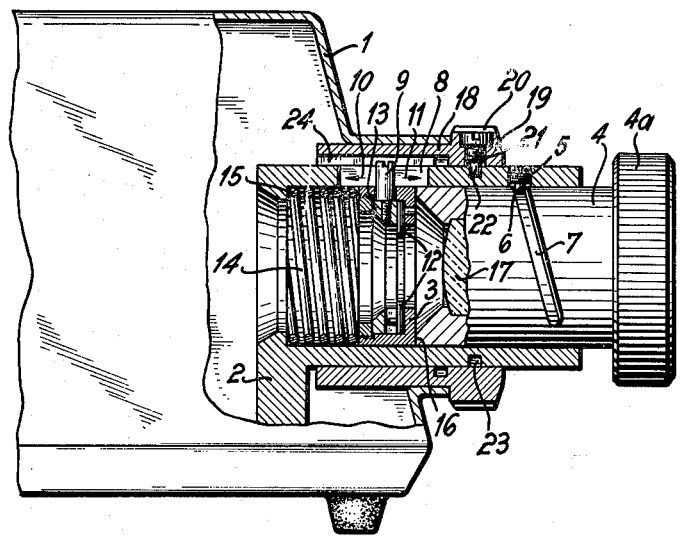
FIG. 1 is a partial side elevational view, partly in section, of a slide projector embodying the invention and in which a spring is utilized to maintain a fixed positional relationship between the objective and the diaphragm during adjustment of the objective.

FIG. 1 illustrates a projector housing 1 bearing a support 2 for diaphragm mounting means or member 3 and an objective mount 4. In the support 2 is arranged a pin or projection 5, 6 engaging a helical groove 7 of the objective mount 4.

The cylindrical portion of support 2 is formed with a longitudinally and circumferentially extending slot 8 through which extends a pin or bolt 9 secured to the outer adjusting ring 13 of an iris diaphragm having blades 12 and positioned in member 3. Pin or bolt 9 may move longitudinally of the slot 8 as indicated by the arrows 10 and 11. Slot 8 has a circumferential extent such as to permit oscillation of pin 9 and ring 13 about the objective axis and through a range sufficient to move blades 12 between the fully open and fully closed positions.

A helical spring 14 has one end engaging a shoulder or flange 15 at the inner end of the cylindrical part of support member 2, and its other end engaging diaphragm mounting means or member 3 and biasing this mounting member into continuous engagement with the inner end of objective mount 4. It will be noted that the posterior or rear lens 17 of the objective is located near such inner end of the objective mount.

A generally cylindrical diaphragm setting device 18 is coaxially telescoped over the cylindrical portion of support 2. Setting device 18 is provided with a setting member or ring 19 which is preferably knurled as at 20. A bolt or pin 21 is secured in setting member 19 and has a reduced diameter pin or extension 22 engaging an annular groove 23 in the cylindrical portion of support 2. Bolt 21, with its extension 22 engaging groove 23, maintains diaphragm setting device 18 axially fixed with respect to the cylindrical portion of support 2 while permitting rotation of setting device 18 relative to such cylindrical portion of support 2.

Setting device 18 is formed with a groove 24 extending longitudinally of its inner surface and having a width sufficient to closely embrace the outer end of pin or bolt 9, so that pin or bolt 9 may thus move longitudinally in either direction along groove 24.

The arrangement of FIG. 1 operates in the following manner. When diaphragm setting device 18 is rotated, the diaphragm is adjusted due to revolution of pin 19 about the axis of the objective end of the diaphragm. However, such relative rotation of setting device 18 does not effect any change in the axial position of diaphragm mounting member 3.

To focus the objective, the knurled ring 4a of objective mount 4 is rotated. By virtue of the interengagement of pin or projection 6 in helical groove 7, such rotation of objective mount 4 will effect an axial displacement of the objective mount for focusing of the objective. Diaphragm mounting member 3 follows the axial displacement of objective mount 4 due to spring 14 which continuously biases mounting member 3 into engagement with the inner end of objective mount 4. Spring 14 also acts as a retaining means for diaphragm mounting member 3. Bolt or pin 9 associated with outer diaphragm ring 13 moves longitudinally of groove 24 and slot 8, so that there is no change in the diaphragm adjustment during focusing of the objective by rotation of objective mount 4. As a result of the described constructional features, diaphragm mounting member 3, and thus the iris diaphragm, always remain in fixed axial relation with condenser lens 17 of the objective.

Figure 2:
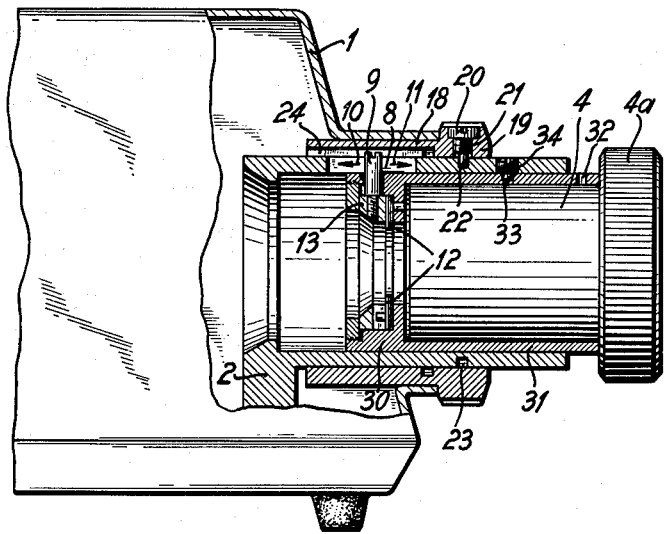
FIG. 2 is a view, similar to FIG. 1, illustrating another embodiment of the invention in which both the diaphragm and the objective are positioned in a common mounting element.

Referring to FIG. 2, the projector housing 1 is again provided with a support 2 in the same manner as in the embodiment of the invention shown in FIG. 1. However, in the arrangement of FIG. 2, a common cylindrical mounting member or element 30 is telescoped within the cylindrical portion of the support 2 and serves as a mounting member for the iris diaphragm 12–13. Common cylindrical mounting element 30 has a forward cylindrical portion or extension 31, which serves as a mount for objective mount 4. The relative position of objective mount 4 in common mounting 30 can be set and fixed by a bolt, set screw, or the like (not shown) engaged in a radial bore 32 of extension 31 of common mount 30.

A longitudinally extending slot 33 is formed in the exterior surface extension 31 of common mount 30, only a portion of this slot being shown in FIG. 2. A screw, bolt, or similar element 34 positioned in the cylindrical portion of support 2 is engaged in slot 33 so that axial adjustment of common mount 30 as a whole, including objective mount 4 positioned therein, can be effected without rotation of common mount 30.

In the same manner as described in connection with FIG. 1, a diaphragm adjusting device 18 is telescoped over the cylindrical portion of support 2 and is provided with setting member or ring 19 having knurled surface 20, as well as with bolt 21 having a reduced diameter extension 22 engaged in annular groove 23 in the cylindrical portion of support 2. Also in the same manner as described in connection with FIG. 1, outer diaphragm ring 13 of the iris diaphragm has secured thereto pin 9 projecting through the longitudinally and circumferentially extending slot 8 in support 2 and into groove 24 in the inner surface of diaphragm setting unit 18.

The arrangement of FIG. 2 operates in somewhat the same manner as that of FIG. 1. Upon rotation of setting device 18, the diaphragm is set through engagement of the pin 9 in groove 24. Pin 9 again does not move axially during rotation of setting device 18. By grasping knurled setting ring 4a of objective mount 4, the entire common mount 30 may be displaced axially, without rotation, to focus the objective.

Figure 3:
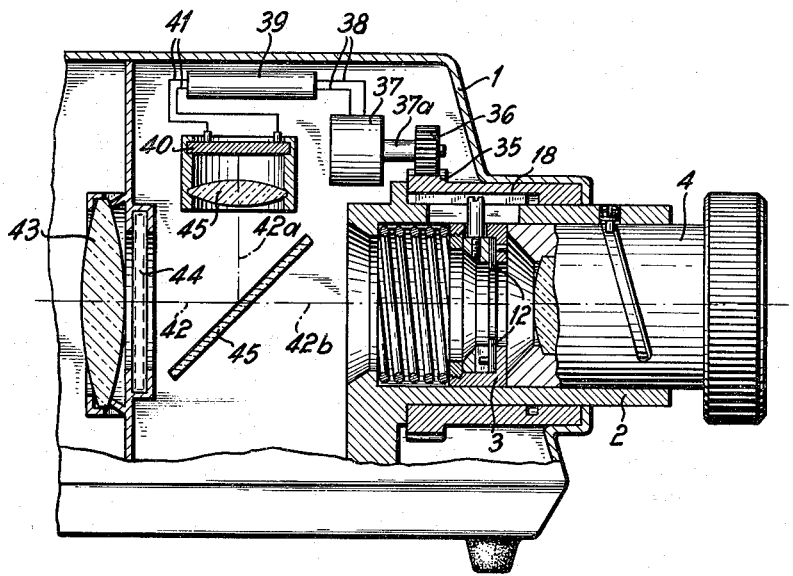
FIG. 3 is a view, similar to FIG. 1, illustrating a further embodiment of the invention in which adjustment of the diaphragm is automatically controlled as a function of the luminous density of a slide to be projected.

FIG. 3 illustrates an embodiment of the invention in which the diaphragm device is adjusted automatically as a function of the luminous density of the slide to be projected. The mechanical interrelation of the parts is the same as shown in FIG. 1, and described in connection therewith.

However, as distinguished from the arrangement of FIG. 1, diaphragm setting device 18 is not accessible from the exterior of the projector housing. Instead, it is provided with a spur gear 35 within the projector housing, and gear 35 has meshed therewith a pinion 36 operated by a control motor 37 through the medium of a shaft 37a. Leads 38 connect motor 37 to a control unit indicated at 39. Control unit 39 may be a resistance bridge circuit for effecting rotation of motor 37 in opposite directions or alternatively, may include a switching relay controlling the direction of rotation of motor 37.

The actuating or sensing signal for control unit 39 is provided from a photoelectric cell 40 which is connected to control unit 39 through conductors or leads 41. The light rays 42 from the lamp or other light source of the projector pass through a condensing lens 43 and then through a slide 44 to be projected. In the path of light rays 42, there is disposed a partially light permeable mirror 45, positioned between slide 44 and the objective. Mirror 45 reflects a portion of the light along a path 42a and through a condensing lens 45 onto photoelectric cell 40. This cell may, for example, be a photoresistance cell. The major portion of light rays 42 pass through mirror 45, as indicated by the ray path 42b, and through the projector objective.

In accordance with the density of slide 44, the control current provided by photoelectric cell 40, or the resistance of such a cell, will be varied. Consequently, a switching relay or equivalent means in the control unit 39 will operate, responsive to a deviation from a normal value, to provide a signal effecting rotation of motor 37 in one direction or the other until a null position is re-attained. Thus, through the medium of pinion 36 driven by shaft 37a of motor 37, diaphragm setting device 18 is angularly adjusted until the diaphragm aperture value, corresponding to the luminous density of the slide 44 to be projected, is attained. The focusing of the objective, and changes in the relative position of the parts, are effected in the same manner as described for FIG. 1.

It will be noted that, in each of the three embodiments of the invention illustrated, interchanging of objectives may be effected in a simple manner.

Control motor 37 of FIG. 3 can further be provided with a remote control cable by which the operator of the projector may adjust the light value at will by remote control. Furthermore, the diaphragm blades 12 could be coupled directly, or through intermediate coupling means, with a moving coil instrument for control of the diaphragm aperture in the same manner as proposed and used in photographic cameras. In such case, control motor 37 and its connection to diaphragm setting device 18 could be eliminated.

Alternatively, control of the diaphragm aperture could be effected by means of cams or other triggering means on the frames of the individual slides, and having positions which are determined by the luminous density of the respective slide. These cams or triggering means could be utilized to effect diaphragm aperture adjustment through intermediate coupling means.

Where the diaphragm is adjusted by means of a servo motor, as exemplified in FIG. 3, the motor can also be controlled by means of a contact strip secured to each individual slide, with each contact strip having a length respectively associated with the luminous density of its particular slide. In such case, the time and direction of energization of motor 37 would be controlled directly by the individual slide and as a function of the luminous density thereof. It will further be appreciated that the diaphragm arrangement of the invention can also be applied to motion picture projectors.

While specific embodiments of the invention have been shown and described in detail to illustrate the application of the principles of the invention, it will be understood that the invention may be embodied otherwise without departing from such principles.

What is claimed is:

1. In a slide projector having a housing and an objective mount, for an objective having a lens, axially adjustable relative to said housing and removably carried by said housing so that one objective mount and an objective carried thereby can be replaced by another objective mount and another objective carried thereby; a variable aperture diaphragm; diaphragm mounting means independent of said objective mount and mounted in said housing behind said objective mount for relative displacement parallel to the axis of said objective, said mounting means positioning said diaphragm in the path of light rays through said objective, said diaphragm mounting means and said diaphragm positioned thereby remaining in said housing when one objective mount and an objective carried thereby is replaced by another objective mount and an objective carried by the latter; and positioning means operatively engaged with said mounting means and maintaining said diaphragm fixed against axial displacement relative to said lens during axial adjustment of said objective mount.

2. In a slide projector, as claimed in claim 1, said lens being the rear lens of the objective; said diaphragm mounting means positioning said diaphragm adjacent the rear end of said objective.

3. In a slide projector, as claimed in claim 1, a common support in said housing; said common support receiving both said objective mount and said diaphragm mounting means; said positioning means comprising biasing means in said common support disposed and interacting between said common support and said diaphragm mounting means to bias said diaphragm mounting means to follow movement of said objective mount.

4. In a slide projector, as claimed in claim 1, a common support in said housing; said common support receiving both said objective mount and said diaphragm mounting means; said lens being the rear lens of said objective and said diaphragm mounting means positioning said diaphragm adjacent the rear end of said objective mount; said positioning means comprising a compression spring engaged between the inner end of said diaphragm mounting means and a shoulder on said common support and biasing said diaphragm mounting means to follow movements of said objective mount.

5. In a slide projector, as claimed in claim 1, a common support in said housing having a tubular portion co-axial with the axis of the objective; said diaphragm mounting means being axially adjustably mounted in the tubular portion of said common support and having a tubular forward extension telescoped in said tubular portion of said common support; said objective mount being cylindrical in cross section and being slidably and telescopically engaged in said tubular extension; and means operable to lock said objective in a selected axial position in said extension.

6. In a slide projector, as claimed in claim 1, a common support in said housing having a tubular portion coaxial with the objective axis; said diaphragm mounting means being supported in said tubular portion and movable axially thereof; said diaphragm including a diaphragm aperture adjusting ring oscillatable about the axis of said objective; a pin secured to and extending radially from said ring; said tubular portion being formed with a longitudinally and circumferentially elongated slot in its side wall; said pin projecting through said slot for movement both longitudinally and circumferentially therein; a diaphragm setting device having a tubular portion telescoped on the tubular portion of said common support, the tubular portion of said diaphragm setting device having a groove extending longitudinally of its inner surface and said pin being engaged in said groove whereby, upon rotation of said setting device relative to said common support, said ring will be oscillated to adjust the diaphragm aperture setting; and means retaining said diaphragm setting device against axial displacement relative to the tubular portion of said common support while providing for relative rotation of said diaphragm setting device about said tubular portion of said common support.

7. In a slide projector, as claimed in claim 6, said objective mount being axially displaceably telescoped in said tubular portion of said common support; said pin moving longitudinally of said slot and said groove upon axial displacement of said objective mount in said common support.

8. In a slide projector, as claimed in claim 1, a common support in said housing having a tubular portion co-axial with the axis of the objective; said diaphragm mounting means being axially displaceably mounted in said tubular portion; a longitudinally and circumferentially elongated slot in the side wall of said tubular portion; a diaphragm setting device having a tubular portion telescopically and rotatably engageable with the tubular portion of said common support; a groove extending longitudinally of the inner surface of the tubular portion of said diaphragm setting device; said diaphragm including an aperture adjusting ring oscillatable about the axis of the objective; a pin secured to and extending radially outwardly from said ring and through said slot into said groove whereby, upon rotation of said diaphragm setting device, said adjusting ring will be rotated; said objective mount being axially displaceably mounted in said tubular portion of said common support and said pin moving longitudinally of said slot and said groove upon relative axial movement of said objective mount in said tubular portion of said support; a servo motor in said housing; and means drivingly connecting said servo motor to said diaphragm setting device to rotate the same to adjust the diaphragm aperture.

9. In a slide projector, as claimed in claim 8, a photoelectric transducer element in said housing; a partially light permeable mirror positioned in the path of light rays directed along the axis of the objective and operable to reflect a portion of said light rays onto said photoelectric transducer; and a control unit connected between said transducer and said servo motor and operative to control operation of said servo motor as a function of the intensity of the light incident upon said transducer.

10. In a slide projector, as claimed in claim 9, a slide mount positioned in the path of light rays directed along the axis of the objective; said mirror being positioned between said slide mount and the objective whereby the light impinging upon said transducer is a function of the luminous density of a slide mounted in said slide mount.

References Cited by the Examiner
UNITED STATES PATENTS

| | | | |
|---|---|---|---|
| 2,116,704 | 5/38 | Laube et al. | 88—24 |
| 2,510,374 | 6/50 | Brady | 88—24 |
| 2,527,106 | 10/50 | Smith. | |
| 3,074,334 | 1/63 | Schafer | 88—24 X |

NORTON ANSHER, *Primary Examiner.*

WILLIAM MISIEK, *Examiner.*